United States Patent [19]
Lehto

[11] 3,983,222
[45] Sept. 28, 1976

[54] REMOVING NITRATES WITH AN ORGANIC AMINE SALT AND ION EXCHANGE

[75] Inventor: Timo Kalevi Lehto, Oulu, Finland

[73] Assignee: Kemira Oy, Finland

[22] Filed: Nov. 18, 1974

[21] Appl. No.: 524,926

[30] Foreign Application Priority Data
Nov. 22, 1973 Finland.............................. 3604/73

[52] U.S. Cl.............................. 423/395; 23/293 R; 23/302 R; 210/21; 210/37 R; 423/1; 423/194; 423/659
[51] Int. Cl.$^2$...................... C01B 21/48; C01D 9/16
[58] Field of Search....... 23/312 ME, 293 R, 302 R; 423/395, 194, 1, 659; 210/21, 22, 37, 41

[56] References Cited
FOREIGN PATENTS OR APPLICATIONS
4,814,318    1973    Japan OTHER PUBLICATIONS
Ross et al., "Solvent Extraction of Nitrate From Titanium Leacher Effluent," Bureau of Mines Report, No. 7733, 1973.

Primary Examiner—Norman Yudkoff
Assistant Examiner—Barry I. Hollander
Attorney, Agent, or Firm—Bucknam and Archer

[57] ABSTRACT

A continuous process for removing nitrates from nitrate containing aqueous solutions having a pH of about 0–7, which comprises: (1) extracting the nitrate containing aqueous solution with an organic amine salt dissolved in an organic solvent phase whereby the nitrate ion goes into the organic solvent, (2) separating the organic phase, (3) stripping the organic extraction solvent phase from the extraction with a stripping salt solution of pH at least 0.5, said salt being capable of ion exchange with the nitrate ion and containing the anion of the amine salt in step (1) to strip and convert the amine for the next extraction cycle into the same amine salt as used for the extraction; and the stripping solution contains the nitrate ion and the cation of the stripping solution; (4) maintaining the concentration of the salt formed by the cation of the stripping salt and the nitrate anion in the stripping solution so high that this salt is crystallized from the stripping solution substantially continuously, but still so low that the nitrate anion extracted into the organic extraction solvent phase passes during the stripping continuously into the stripping solution while the anion of the stripping salt passes from the stripping solution into the organic extraction solvent phase; and recovering crystallized nitrate salt from the stripping solution.

11 Claims, 4 Drawing Figures

REMOVING NITRATES WITH AN ORGANIC AMINE SALT AND ION EXCHANGE

BACKGROUND OF THE INVENTION

1. Field of the Invention

The present invention relates to a process for a continuous removal of nitrates from nitrate containing solutions by extracting the solution in question with an organic amine which is in a salt form substantially insoluble therein and by stripping the organic phase used for the extraction with a stripping reagent which, in addition to stripping, converts the amine, for the next extraction cycle, into the same salt as is used in the extraction, whereby the concentration of the salt formed by the cation of the stripping salt and the nitrate anion in the stripping solution is kept so high that this salt is crystallized from the stripping solution substantially continuously, but still so low that the nitrate anion extracted into the organic extraction solvent phase continuously passes into the stripping solution during the stripping while the anion of the stripping salt passes from the stripping solution into the organic extraction solvent phase, and the crystallized nitrate salt is recovered from the stripping solution.

2. Description of the Prior Art

It has been previously known to use for the extraction of nitrates a primary, secondary or tertiary aliphatic and/or aromatic amine which is substantially water insoluble or which can be made water insoluble. It is preferable to use a secondary amine with the formula R'—NH—R'', wherein R' and R'' are branched hydrocarbon chains containing a total of approx. 24–27 carbon atoms. One example of such an amine is the secondary amine available under the trademark AMBERLITE LA-1 (molecular weight approx. 351–393, manufacturer Rohm & Haas, Philadelphia, U.S.A.), which is known to be applicable to the extraction of nitrates and several metal ions, among others. To achieve the requisite settling and to maintain suitable extraction conditions in the extraction apparatus, the above secondary amine is dissolved in some suitable extraction reagent diluent to form a solution of the suitable concentration.

It is known that when the said amine is brought into a suitable salt form, which is thereafter contacted with the nitrate-containing solution to be extracted, the nitrate anion changes place with the anion of the amine salt while the nitrate anion passes into the organic phase and the anion of the said amine salt into the aqueous phase.

It is also known that the above nitrate salt of the amine can be contacted with another aqueous phase, one that contains a stripping reagent which reconverts the amine into the same salt that was used for the extraction, whereby the nitrate anion respectively passes from the organic phase into the said second aqueous solution.

This known liquid anion exchange process can be illustrated with the following simple balance reaction equation:

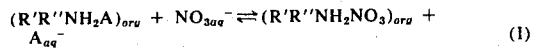

$$(R'R''NH_2A)_{org} + NO_{3aq}^- \rightleftharpoons (R'R''NH_2NO_3)_{org} + A_{aq}^- \quad (1)$$

wherein $A^-$ stands for some anion. The extraction takes place in a known manner in the direction of the upper arrow of the balance equation and the re-extraction, or stripping, in the direction of the lower one. It is known that the reaction can be caused to occur in the direction of the lower arrow when the concentration of the $A^-$ salt in the stripping solution is kept high enough.

The present invention especially relates to a method of the type specified in the introduction.

Such a method is known from Japanese Publication No. 48-14318/73, according to which the stripping is carried out with a very acid salt solution (4–5 mol $H^+$/kg), for which reason a temperature of 0°C, preferably −20°C, must be used for crystallizing $KNO_3$ from the said stripping solution, since the solubility of salts increases when the acidity of the salt solution increases. Owing to the low temperature the industrial application of such a method is extremely costly and complicated. In addition, the organic phase (especially heavy amine) is highly viscous at such low temperatures and therefore poorly flowing.

Furthermore, the extraction of nitrates and the production of $KNO_3$ are carried out from a strong nitric acid solution, i.e. from a very acid solution pH 0.

SUMMARY OF THE INVENTION

According to the present invention the pH of the nitrate containing solution to be extracted is approx. 0–7.0, preferably approx. 1.3–6.0.

It has accordingly been observed that the said stripping salt solution can be kept substantially less acid than in the above Japanese publication, preferably as a neutral salt solution, but suitably also within the pH range 0.5–7.0. Under these conditions a sufficient crystallization of the $KNO_3$ salt from the salt solution does not require temperatures below normal room temperature (20°–25°C). The present method is thus also fully applicable industrially. Temperatures of 20° to 30°C are suitable.

According to the invention, the extraction of nitrates can usually be carried out from a nitrate containing aqueous solution which need not necessarily contain nitric acid but can instead contain salts of nitric acid, its pH varying from the neutral range to highly acid. Furthermore, the said nitrate containing aqueous solution to be treated can also contain other anions. It has been noted that the extraction takes place selectively in regard to nitrates.

The stripping reagent according to one embodiment of the invention is KCl salt ($A^-$ is $Cl^-$), in which case the nitrate is crystallized as $KNO_3$ from the stripping solution. The KCl salt can be relatively impure and still very pure $KNO_3$ is obtained by the said method.

The method according to the invention provides a remarkable advantage in relation to previous methods, in which the extracted nitrate is recovered as relatively mild solutions in regard to $NO_3^-$, namely, that in the method according to the invention the nitrate is recovered directly as a solid salt without cooling or expensive evaporation and, furthermore, by a closed circulation of the stripping solution the extraction solvent losses at the stripping stage are almost completely eliminated.

Figure 3:
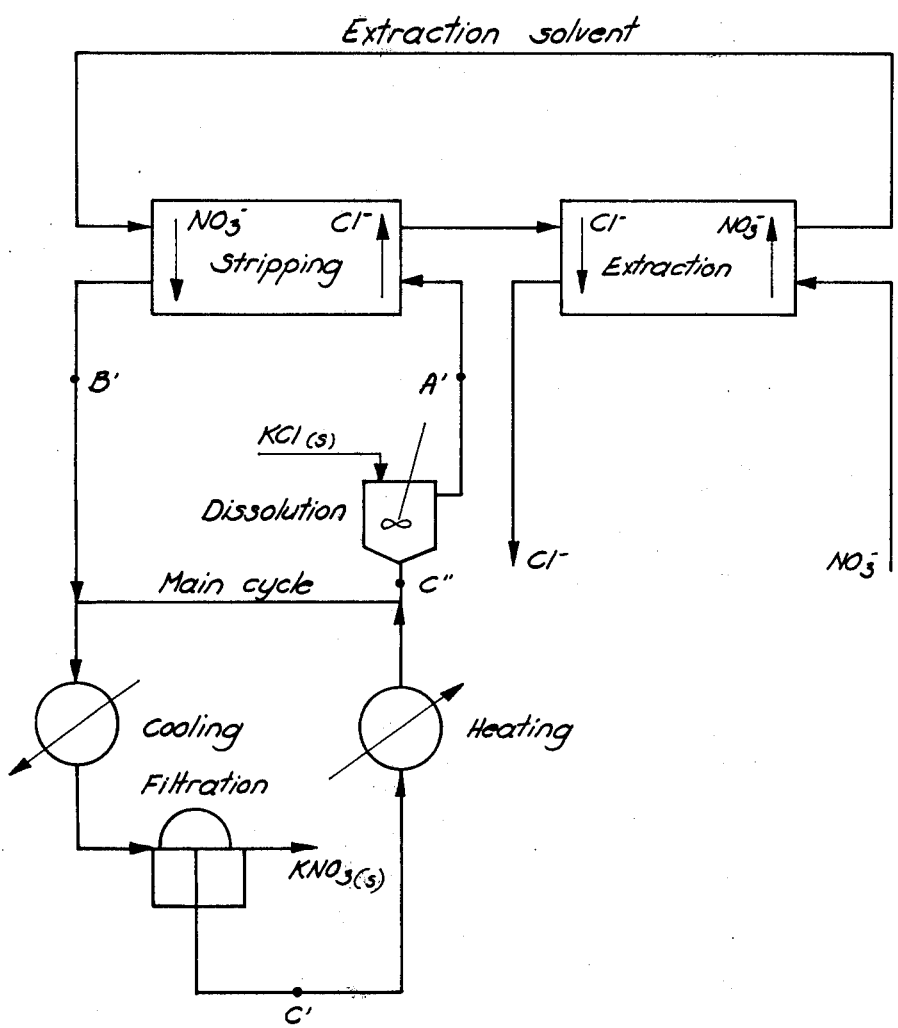

The flow chart according to FIG. 3 illustrates an alternate embodiment of the invention, wherein the crystallization of $KNO_3$ is carried out under highly controlled conditions.

Figure 4:
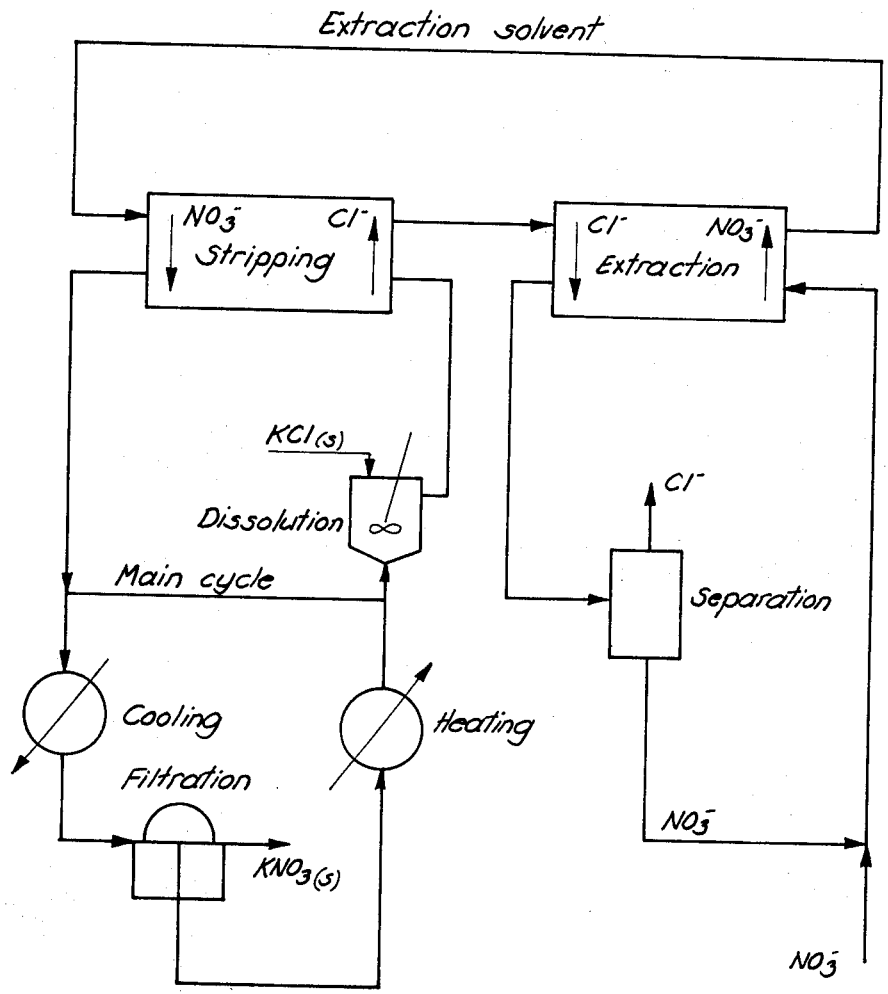

The flow chart according to FIG. 4 illustrates a process according to the invention which is similar to that shown in FIG. 3 except that even the aqueous extraction solution of the extraction part has been brought into closed circulation.

DESCRIPTION OF THE PREFERRED EMBODIMENTS

The process according to the invention is described below with reference to the flow chart of FIG. 2 and the phase balance diagram of FIG. 1:

The pH of the nitrate containing solution to be treated is approx. 1.5 and its nitrate nitrogen concentration approx. 1000 ppm. The extraction reagent used is the above-mentioned AMBERLITE LA-1, which has been diluted in kerosene into a 5-percent (vol.) extraction solvent. The amine present in the extraction solvent goes from the stripping part into the extraction part in the form of a chloride salt and there comes in contact with the nitrate containing solution, whereby an exchange of nitrates into chlorides takes place, i.e., the ion exchange reaction illustrated by Equation I takes place in the direction of the upper arrow.

The extraction solvent phase is separated by settling from the thereby obtained dispersion formed by the extraction solvent phase and the aqueous phase to be extracted. The aqueous phase is thereafter substantially devoid of nitrate. By carrying out several extraction stages countercurrently and by suitably regulating the ratio between the flows of the extraction solvent phase and the water phase and the concentration of the amine in its diluent, the nitrate can be exchanged in the aqueous phase almost completely into chlorides. The said aqueous phase leaving the extraction also contains some extraction solvent dissolved in it, for which reason the said aqueous phase can, when necessary, be conducted to further treatments to remove the extraction solvent from the aqueous phase and to minimize the extraction solvent losses. The extraction solvent phase obtained by settling is then fed to the stripping stage. The stripping is carried out with KCl salt, which is added continuously into the stripping solvent circulation in an amount equivalent to the nitrate exchanged in the extraction part. The nitrate containing extracted solvent from the extraction and the said stripping solution are contacted with each other countercurrently. The composition of the stripping solution arriving at the stripping stage corresponds to point A in the phase balance diagram of FIG. 1, i.e., the said stripping solution is at its saturation point in regard to $KNO_3$. At the stripping stage the nitrates pass from the extraction solvent phase into the stripping solution and respectively the chlorides pass from the stripping solution into the extraction solvent phase to replace the nitrates, i.e., the ion exchange reaction indicated by Equation I takes place in the direction of the lower arrow, when the $Cl^-/NO_3^-$ ratio and the total salt concentration are suitable.

Both in the stripping part and in the extraction part, several balance stages can be used countercurrently, and by suitably setting the ratio between the flows of the extraction solvent phase and the stripping solution and the amine concentration in its diluent, the nitrates can again be exchanged into chlorides almost completely. The extraction solvent phase is separated by settling from the dispersion formed by the extraction solvent phase and the stripping solution obtained from the stripping part. The stripping solution from the stripping part is now oversaturated in regard to $KNO_3$, i.e., a move has been made from point B to point C in the phase balance diagram of FIG. 1. Thereafter the crystals are separated and KCl is added to the mother liquor, the compensation of which corresponds to point C (FIG. 1), in such an amount that a transfer takes place from point C to point A in the phase balance diagram of FIG. 1, whereafter the said mother liquor is returned in closed circulation to the stripping as a stripping solution feed. The amine present in the extraction solvent phase emerging from the stripping part after the settling is mainly in chloride salt form, and the extraction phase is then refed into the extraction part, where it is contacted with a nitrate containing solution, whereby the above-mentioned exchange of nitrates into chlorides takes place, whereafter the extraction solvent phase, in which amine is again mainly in nitrate salt form, is returned to the stripping stage and the cycle starts again.

The flow chart of FIG. 3 shown an alternative embodiment of the invention, wherein the crystallization of $KNO_3$ is carried out under highly controlled conditions. The process is similar to the process described above except that the crystallization of $KNO_3$ is carried out completely outside the stripping part in its separate crystallization cycle and the dissolving of raw, impure potassium salt in the stripping solution is carried out prior to the stripping part.

Figure 1:
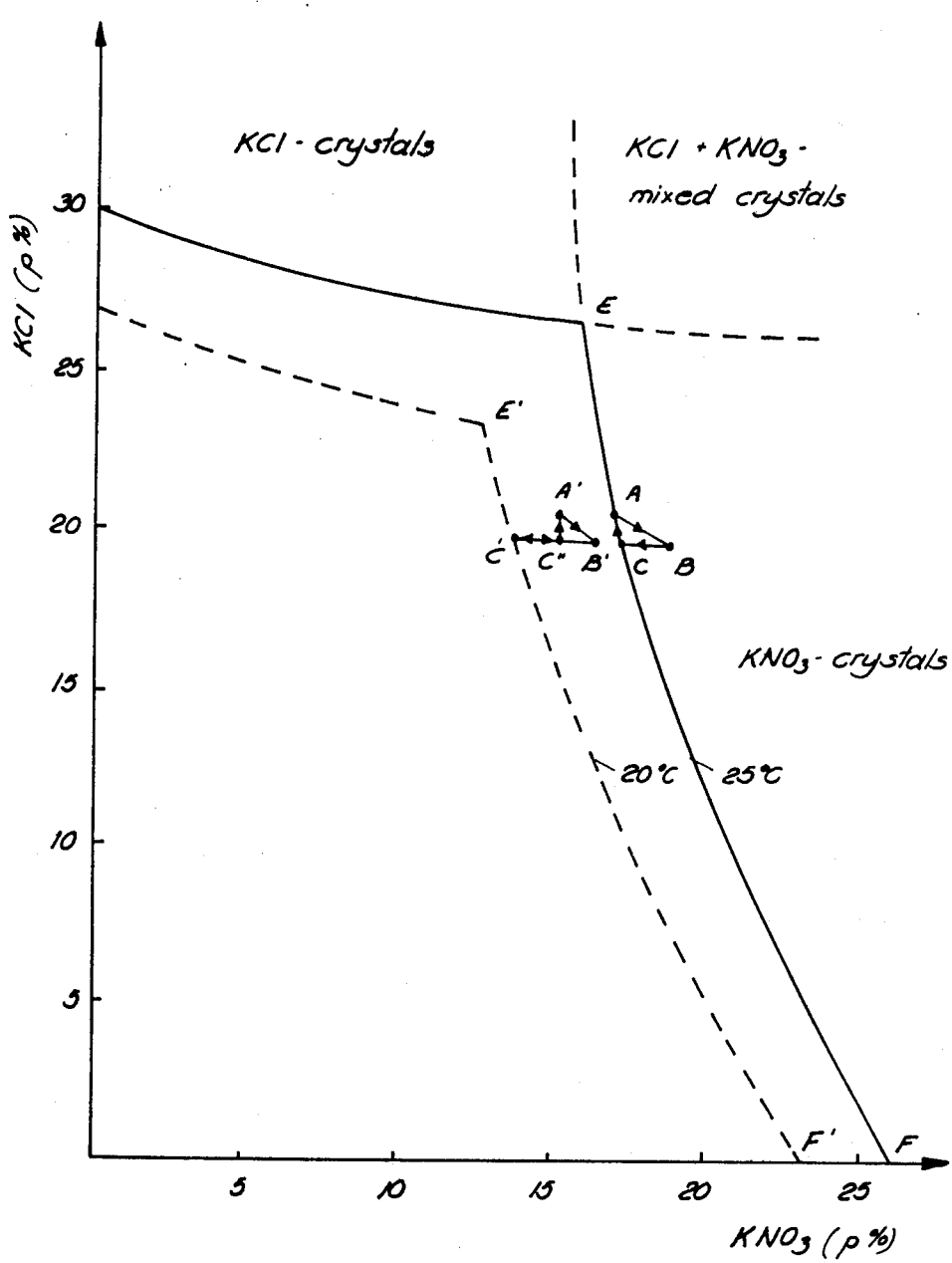
FIG. 1 shows a phase balance diagram of $KNO_3$—KCl—$H_2O$, illustrating the crystallization conditions of $KNO_3$ at two different temperatures.
Figure 2:
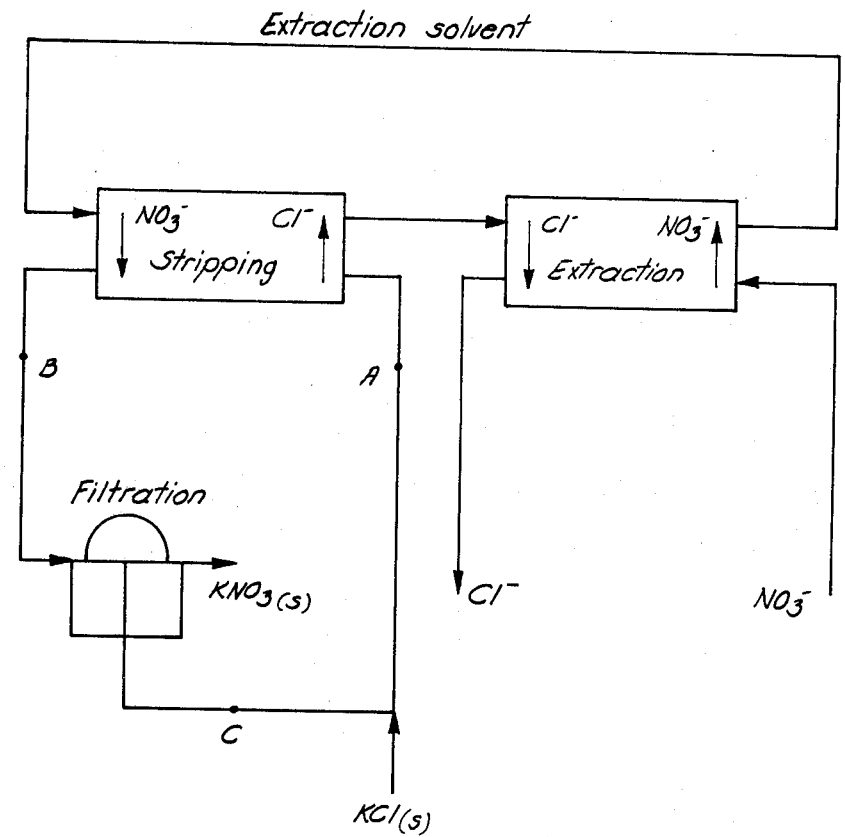
FIG. 2 illustrates one simple continuous extraction process according to the invention, wherein the stripping solution is in closed circulation and a raw, impure potassium salt is used as the stripping reagent.

The composition of the stripping solution coming to the stripping stage corresponds to point A' in the phase balance diagram of FIG. 1, i.e., under these conditions (temperature 25°C) the aqueous stripping solution has not yet reached its saturation point in regard to $KNO_3$. The stripping solution emerging from the stripping part is concentrated in regard to $KNO_3$, owing to the $Cl^-/NO_3^-$ exchange and diluted in regard to KCl, i.e., a transfer takes place from point A' to point B' in the phase balance diagram of FIG. 1.

From the main cycle of the stripping solution, a suitable part of the original amount is taken as a secondary cycle. The said secondary cycle is cooled appropriately, whereby the result is an effective oversaturation of $KNO_3$, i.e., in the phase balance diagram of FIG. 1 the phase boundary EF is transferred to the left from point B' to E'F', whereby the said solution is oversaturated in regard to $KNO_3$. Hence follows a crystallization of a $KNO_3$ amount corresponding to the oversaturation, i.e., a transfer takes place from point B' to C' in the phase balance diagram of FIG. 1. The crystals are separated and washed once or several times with a saturated $KNO_3$ solution which has been prepared from previously crystallized $KNO_3$. Thereby pure crystals, 99.9 % $KNO_3$, are obtained. The produced crystals contain hardly any organic solvent, for example (5 mg/kg $KNO_{3(s)}$). The mother liquor is reheated to its original temperature and returned to its original temperature and returned to the main cycle of the stripping solution, whereby the phase boundary E'F' in the phase balance diagram of FIG. 1 moves back to the right to phase boundary EF, and a transfer takes place from point C' to C''. Thereafter so much KCl is added to the stripping solution that a transfer takes place from point C'' to A' in the phase balance diagram of FIG. 1, whereafter the acid solution is returned in closed cycle to the stripping stage as a stripping solution feed.

By the said crystallization method it can be ensured that $KNO_3$ crystals are not produced in the stripping part but only outside it, in the crystallization cycle, since the composition of the actual stripping solution can be kept considerably below the saturation point (see point A' in FIG. 1). Furthermore, the presence of KCl crystals in the stripping part is eliminated since KCl is dissolved separately in an efficient mixer-reactor before being introduced into the stripping part. Thereby a safety risk is avoided (risk of explosion) and the risk of clogging caused by crystals is eliminated in the apparatus. This procedure has a further advantage in that very pure and practically almost solvent-free $KNO_3$ crystals are obtained, and owing to the closed cycle no solvent losses from the stripping part are incurred. According to one embodiment of the invention, the stripping solution contains in addition to the stripping salt, other salts which are inert, that is they serve to facilitate the salting out of potassium nitrate.

The flow chart according to FIG. 4 illustrates a process according to the invention which is similar to the process illustrated in FIG. 3 except that even the aqueous extraction solution of the extraction part has been brought into a closed cycle. The aqueous extraction solution phase, which mainly contains $Cl^-$ and in certain cases some unextracted $NO_3^-$ ions and a small amount of dissolved extraction solvent, is conducted into the separation part, where the $Cl^-$ ions are removed from the aqueous extraction solutions. Thereafter the aqueous nitrate solution to be treated is added to the substantially $Cl^-$ free aqueous extraction solution and returned to the extraction in closed cycle.

With this procedure the extraction part need not completely exchange $Cl^-$ ions and $NO_3^-$ ions with each other, and thus extraction solvent losses in the extraction part are also eliminated.

The invention is described below in more detail with reference to the examples:

EXAMPLE 1

1 liter of an aqueous solution which contained 7000 mg/l of $NO_3^-$ and with a pH of 5.28 was extracted with 2 liters of an extraction solvent which contained 5 % by vol. a primary amine (trade name PRIMENE JMT, manufacturer Rohm & Haas, U.S.A.) in kerosene and in which the amine had been brought into a Cl salt form by saturating the said solvent with a 10 % hydrochloric acid. The composition of the aqueous solution separated after extraction was as follows: 1675 mg/l $NO_3^-$ and 3700 mg/l $Cl^-$, and the pH of the solution was 3.05 and the composition of the separated extraction solution was as follows: 2295 mg/l $NO_3^-$ and 2197 mg/l $Cl^-$. The extraction percentage of the nitrates was 76 %.

EXAMPLE 2

The following stripping test series was performed: an extraction solvent which contained 5 % a primary amine (trade name PRIMENE JMT, manufacturer: Rohm & Haas, U.S.A.) in $NO_3^-$ salt form in kerosene was stripped 10 times in succession with an aqueous solution saturated in regard to KCl. 10 extraction solvent batches of 2 liters with the said composition were prepared and stripped successively with a 1 liter batch of aqueous stripping solution so that the next extraction solvent batch was always stripped with the aqueous stripping solution separated from the previous stripping stage. The aqueous stripping solution entering the 1st stripping stage was saturated aqueous KCl solution containing 144 000 mg/l $Cl^-$ and with a pH of 9.12. The composition of the aqueous stripping solution separated after the 1st stripping stage was as follows: 14 300 mg/l $NO_3^-$ and 136 000 mg/l $Cl^-$, and the pH of the solution was 5.80. The stripping percentage of the nitrate at this 1st stage was 95 %. Respectively, the composition of the aqueous stripping solution separated after the 10th stripping stage was as follows: 116 300 mg/l $NO_3^-$ and 65 000 mg/l $Cl^-$, and the pH of the solution was 1.94. The stripping percentage of the nitrates at this 10th stage was 69 %. The $KNO_3$ concentration in the aqueous stripping solution separated at this stage surpassed the saturation point.

EXAMPLE 3

1 liter of an aqueous solution which contained 7000 mg/l $NO_3^-$ and with a pH of 1.43 was extracted with 2 liters of an extraction solvent which contained 5 % by vol. a secondary amine (trade name AMBERLITE LA-1, manufacturer Rohm & Haas, U.S.A.) in kerosene and in which the amine had been brought into a Cl salt form by saturating the said solution with a 10 % hydrochloric acid. The composition of the aqueous solution separated after extraction was as follows: 200 mg/l $NO_3^-$ and 3815 mg/l $Cl^-$, and the pH of the solution was 1.41, and the composition of the separated extraction solvent was as follows: 3307 mg/l $NO_3^-$ and 2076 mg/l $Cl^-$. The extraction percentage of the nitrate was 97 %.

EXAMPLE 4

A test series according to Example 2 was performed by using 5 % by vol. a secondary amine (trade name AMBERLITE LA-1, manufacturer Rohm & Haas, U.S.A.) in the form of a $NO_3^-$ salt in kerosene. The composition of the aqueous stripping solution separated after the 1st stripping stage was as follows: 29 500 mg/l $NO_3^-$ and 129 000 mg/l $Cl^-$, and the pH of the solution was 1.13. The stripping percentage of the nitrates at this 1st stage was 76 %. Respectively the composition of the aqueous solution separated after the 10th stripping stage was as follows: 156 500 mg/l $NO_3^-$ and 64 700 mg/l $Cl^-$, and the pH of the solution was 0.65. The stripping percentage of the nitrates at this stage was 26 %. The $KNO_3$ concentration of the separated stripping solution surpassed the saturation point at the 7th stripping stage, at which time the $KNO_3$ began to crystallize and the crystallization continued until the 10th stage.

EXAMPLE 5

1 liter of an aqueous solution containing 20 000 mg/l of $NO_3^-$ in the form of sodium nitrate and with a pH of 7.00 was extracted with 3 liters of an extraction solvent containing 9 % by vol. a secondary amine (trade name AMBERLITE LA-2, manufacturer Rohm & Haas, U.S.A.) in kerosene, the amine being in the form of $Cl^-$ and $NO_3^-$ salts as follows: 3500 mg/l $Cl^-$ and 5600 mg/l $NO_3^-$. The composition of the aqueous phase separated after extraction was as follows: 5000 mg/l $NO_3^-$ and 8500 mg/l $Cl^-$, and the composition of the separated extraction solvent was as follows: 10 600 mg/l $NO_3^-$ and 700 mg/l $Cl^-$. The extraction percentage of the nitrates was 75 %.

EXAMPLE 6

The extraction solvent separated after an extraction according to the previous example was stripped at 37°C with 1 liter of a saturated salt solution with the following composition: 136,500 mg/l $NO_3^-$ and 155,000 mg/l $Cl^-$ and with a pH of 0.5. The composition of the stripping solution phase separated after the stripping was as follows: 149,500 mg/l $NO_3^-$ and 148,000 mg/l $Cl^-$, and the composition of the extraction solvent phase separated after the stripping was as follows: 6500 mg/l $NO_3^-$ and 3000 mg/l $Cl^-$. The stripping percentage of the nitrates was 40 %.

EXAMPLE 7

1 liter of an aqueous solution containing 10 g/l of $Ca(NO_3)_2$ and with a pH of 6.00 was extracted with 2 liters of an extraction solvent containing 5 % by vol. a secondary amine (trade name AMBERLITE LA-1, manufacturer Rohm & Haas, U.S.A.) in kerosene and in which the amine had been brought into a Cl salt form by saturating the acid solution with a 10 % hydrochloric acid. The composition of the aqueous solution separated after the extraction was as follows: 2270 mg/l $NO_3^-$ and 4300 mg/l $Cl^-$ and the pH of the solution was 1.70, and the composition of the separated extraction solvent was as follows: 3100 mg/l $NO_3^-$ and 1290 mg/l $Cl^-$. The extraction percentage of the nitrates was 73 %.

EXAMPLE 8

1 liter of an aqueous solution which contained 98.5 g/l of $NO_3^-$ in the form of nitric acid and with a pH of <0 was extracted with 5 liters of an extraction solvent which contained 10 % by vol. a secondary amine (trade name AMBERLITE LA-1, manufacturer Rohm & Haas, U.S.A.) in kerosene, in which the amine had been completely brought into a $Cl^-$ salt form by saturating the solution with a 10 % hydrochloric acid. The composition of the aqueous phase separated after the extraction was as follows: 36.5 g/l $NO_3^-$ and 37.0 g/l $Cl^-$ and the composition of the separated extraction solvent was as follows: 12.5 g/l $NO_3^-$ and 0.5 g/l $Cl^-$. The extraction percentage of the nitrates was 63 %.

EXAMPLE 9

The extraction process according to FIG. 3 was carried out continuously on the bench scale so that both the extraction and the stripping parts comprised 3 countercurrently arranged mixersettler units. The organic solvent was AMBERLITE LA-1 dissolved in kerosene into a 3.5 % (vol.) solution. The phase ratio (extraction solvent phase/aqueous phase) was 1.84 in the extraction and 2.01 in the stripping. The temperature was +25°C in both the extraction and the stripping, and the change of temperature in the cooling and the heating of the crystallization cycle was 5°C. The KCl feed was 30 g/h, the crystallization solution circulation 1.5 l/h, and $KNO_3$ was produced at 40 g/h.

A more detailed analysis of the flows and concentrations at various stages is given below:

Material balance

1. Extraction solvent circulation 10 l/h, with the following analyses at different stages:

|  |  | After extraction | After stripping |
|---|---|---|---|
| $\rho$ | [g/cm³] | 0.780 | 0.775 |
| $NO_3^-$ | [ppm] | 5937 | 3615 |
| $Cl^-$ | [ppm] | 376 | 1660 |
| Amine | [ppm] | 43 420 | 43 420 |

2. Feed = $NO_3^-$ solution to be purified, and purified $NO_3^-$ solution

|  |  | Feed 5.5 l/h | Purified $NO_3^-$ solution 5.5 l/h |
|---|---|---|---|
| $\rho$ | [g/cm³] | 1.013 | 1.005 |
| $NO_3^-$ | [ppm] | 5110 | 848 |
| $Cl^-$ | [ppm] | 14 | 2300 |
| Amine | [ppm] | — | 32 |
| pH |  | 1.31 | 1.32 |
| Extraction percentage of $NO_3^-$ 84%. | | | |

3. Main cycle of stripping solution

|  |  | Before stripping 5 l/h | After stripping 5 l/h |
|---|---|---|---|
| $\rho$ | [g/cm³] | 1.266 | 1.270 |
| $NO_3^-$ | [ppm] | 114 600 | 119 300 |
| $Cl^-$ | [ppm] | 126 200 | 123 300 |
| Amine | [ppm] | <0.4 | <0.4 |
| pH |  | 2.48 | 2.48 |

40 g/h $KNO_3$ was produced in the crystallization, with a purity of 95 % $KNO_3$ before wash and 99.7 % $KNO_3$ after one wash.

What is claimed is:

1. A continuous process for removing nitrates from nitrate containing aqueous solutions having a pH of about 0–7, which comprises: (1) extracting the nitrate containing aqueous solution with an organic amine salt dissolved in an organic solvent phase whereby the nitrate ion goes into the organic solvent, (2) separating the organic phase, (3) stripping the organic extraction solvent phase from the extraction with a stripping salt solution of pH at least 0.5, said salt being capable of ion exchange with the nitrate ion and containing the anion of the amine salt in step (1) to strip and convert the amine for the next extraction cycle into the same amine salt as used for the extraction; and the stripping solution contains the nitrate ion and the cation of the stripping solution; (4) maintaining the concentration of the salt formed by the cation of the stripping salt and the nitrate anion in the stripping solution so high that this salt is crystallized from the stripping solution substantially continuously, but still so low that the nitrate anion extracted into the organic extraction solvent phase passes during the stripping continuously into the stripping solution while the anion of the stripping salt passes from the stripping solution into the organic extraction solvent phase; and recovering crystallized nitrate salt from the stripping solution.

2. The process of claim 1, in which the stripping is carried out at a temperature of about 20°–30°C.

3. The process of claim 1, in which the amine is one of the primary, secondary and tertiary aliphatic and aromatic amines the alkyl groups of which contain 10–20 carbon atoms and which is substantially water insoluble and diluted with at least one of the aliphatic and aromatic hydrocarbons.

4. The process of claim 1, in which nitrate salt is separated from the stripping solution after stripping and the stripping solution is recycled to the stripping after stripping salt has been added to it in an amount equivalent to the nitrate salt separated from it.

5. The process of claim 4, wherein the salting-out of the nitrate salt is carried out by conducting part of the stripping solution to a secondary cycle;
   cooling the secondary cycle;
   recovering the produced nitrate salt crystals;
   then heating the secondary cycle; and
   recycling it to the main cycle of the stripping solution, which thus is kept devoid of crystals.

6. The process of claim 1, in which the stripping solution contains an additional inert salt in an amount suitable for raising the total salt concentration and for facilitating the salting-out of the nitrate salt.

7. The process of claim 6, in which the stripping salt and inert salt are selected so that they do not dissolve in the nitrate salt being salted out.

8. The process of claim 1, in which the stripping salt anion which is transferred from the extraction organic solvent into the aqueous solution during the extraction is continuously removed from the aqueous solution, which is thereafter added to the nitrate solution to be extracted and is recycled to the extraction.

9. The process of claim 1, wherein the stripping salt is a chloride salt.

10. The process according to claim 1 wherein the pH of the stripping solution is not in excess of 7.

11. The process according to claim 1 wherein the pH of the nitrate-containing solution is 1.3 to 6.

* * * * *